United States Patent [19]

Lenz

[11] Patent Number: 5,062,523
[45] Date of Patent: Nov. 5, 1991

[54] CONVEYOR FOR SHAFT-LIKE PARTS
[75] Inventor: Roger L. Lenz, Dimondale, Mich.
[73] Assignee: General Motors Corporation, Detroit, Mich.
[21] Appl. No.: 569,150
[22] Filed: Aug. 20, 1990
[51] Int. Cl.[5] .............................................. B65G 29/00
[52] U.S. Cl. ............................... 198/463.4; 198/463.6; 198/478.1; 198/608
[58] Field of Search ............... 198/463.4, 463.6, 478.1, 198/480.1, 481.1, 608, 781, 789

[56] References Cited

U.S. PATENT DOCUMENTS

| 2,430,648 | 10/1943 | Schonrock. | |
|---|---|---|---|
| 4,326,623 | 4/1982 | Zacharias et al. | 198/608 X |
| 4,361,221 | 11/1982 | Michal | 198/463.6 X |
| 4,561,536 | 12/1985 | Weaver et al. | |
| 4,930,616 | 6/1990 | Lindberg | 198/463.6 |

Primary Examiner—Joseph E. Valenza
Assistant Examiner—Tuan N. Nguyen
Attorney, Agent, or Firm—Robert J. Outland

[57] ABSTRACT

A roller type conveyor has a series of rotors on a frame, each rotor being continuously driven and having a pair of spaced discs overlapping the discs of adjacent rotors. The discs have aligned notches for sequentially engaging the parts and carrying the parts to the next rotor downstream where they are picked up for another movement when the notches of the downstream rotor engage the parts. Gates journaled on each rotor have levers which are actuated by a part on a rotor to move stops into the path of part movement to prevent pickup of a second part by a rotor as long as the rotor is occupied.

8 Claims, 2 Drawing Sheets

CONVEYOR FOR SHAFT-LIKE PARTS

FIELD OF THE INVENTION

This invention relates to conveyor apparatus and particularly to apparatus for conveying shaft-like parts.

BACKGROUND OF THE INVENTION

In the manufacture of camshafts for internal combustion engines the cams and journals along the camshaft are machined and polished in different stages and it is necessary to efficiently move the parts from one operating station to another without any damage to the machined surfaces. Thus it is desired to transfer the part without touching the machined surfaces by another part or by the transfer mechanism.

In prior practice, one method of conveying camshafts involved transferring the parts stepwise from one holder to another thus advancing each part incrementally through many holders to the end of the conveyor. In the event an upstream holder was empty, the empty space was transferred down the conveyor thus making inefficient use of the apparatus. This type of conveyor is a non-accumulating conveyor; however, an accumulating type which fills in the empty spaces is preferred.

U.S. Pat. No. 4,561,536 to Weaver et al discloses an accumulating conveyor for spindle shaped parts having a series of overlapping rotors each carrying a pair of notched discs for holding a part and, upon rotation, transferring the part to the notch of the next disc. The rotors are chain driven through individual slip clutches which allow each rotor holding a part to stop with the part engaging the periphery of the next downstream rotor and wait until a notch on the downstream rotor removes the part from the stationary upstream rotor. From the standpoints of initial cost, maintenance, and machine integrity the clutches are not considered to be acceptable, particularly in the case of a long conveyor which would require perhaps hundreds of rotors and slip clutches. Weaver et al teaches the loading of parts at one end of the conveyor and the discharge at the other end. It is desirable, however, to top load the conveyor at a number of points along its length.

SUMMARY OF THE INVENTION

It is therefore an object of the invention to provide an accumulating conveyor of the rotor type requiring no slip clutches. It is another object to provide a conveyor for camshafts having no contact with machine surfaces of the camshafts. It is also an object to provide an accumulating conveyor which can readily be top loaded at various places along its length.

The invention is carried out by a transfer apparatus for moving shaft-like parts from one station to another comprising: frame supporting a linear array of horizontal parallel shafts, each shaft mounted for rotation about its axis; drive means coupled to the shafts for continuously driving the shafts for uninterrupted rotation; each shaft carrying a pair of spaced discs mounted for rotation with the respective shaft, the discs of each shaft overlapping and axially spaced from the discs of adjacent shafts; each pair of discs having aligned notches for receiving a part and carrying the part in the direction of disc rotation to a transfer station; and gate means responsive to the presence of a first part engaged by a pair of discs for preventing the movement of a second part into the notches of a pair of discs already engaging the first part.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a conveyor which was designed specifically for transfer of camshafts between machining stations, however it has wide application to other elongated parts which resemble shafts. In addition, the conveyor may carry parts through an operation station rather than only to an operating station. For example, since the parts are constantly rotating, the conveyor is ideally suited to a washing operation with a vertical spray of cleansing fluid scrubbing all areas of the parts.

Figure 1:
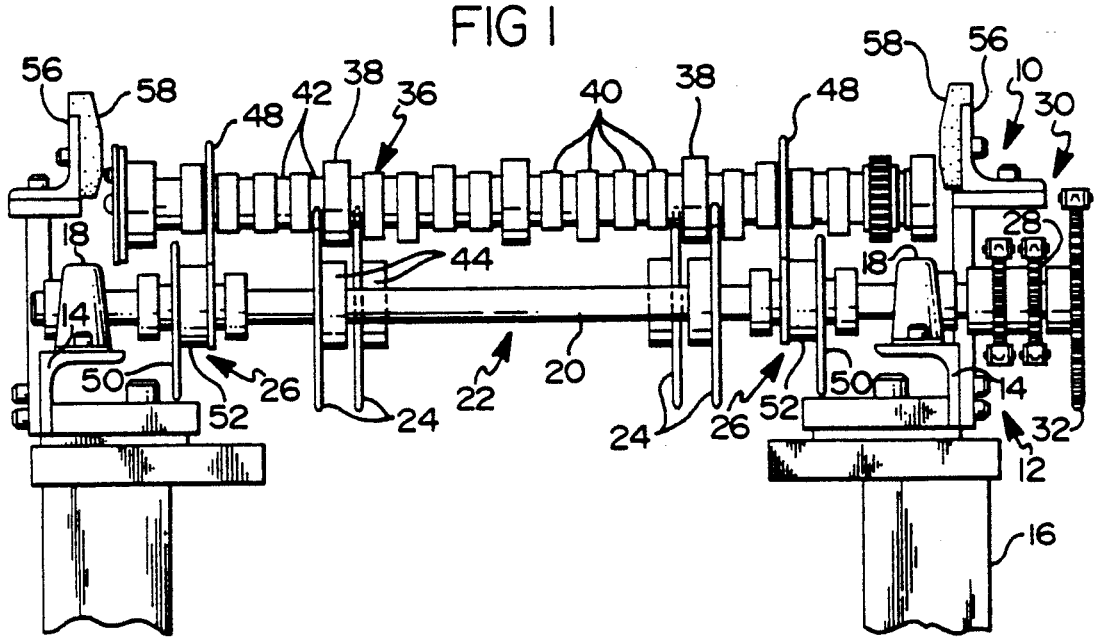
FIGS. 1 and 2 are front and side elevations, respectively, of a conveyor according to the invention.
Figure 2:
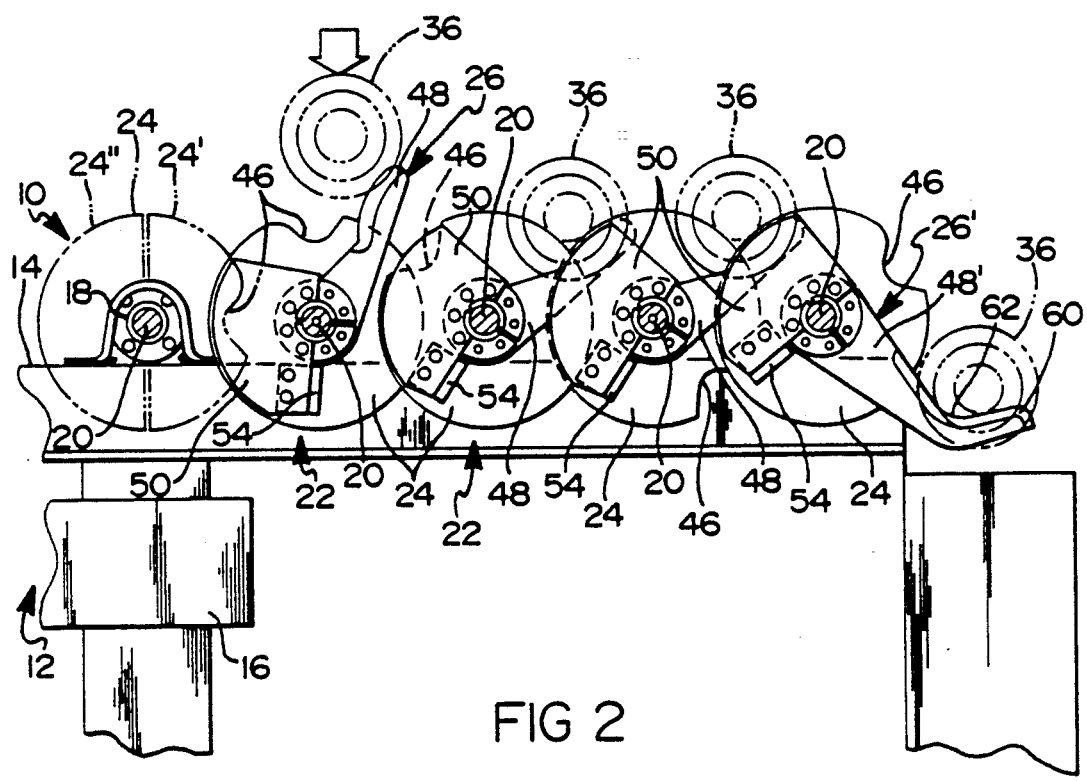
Figure 3:
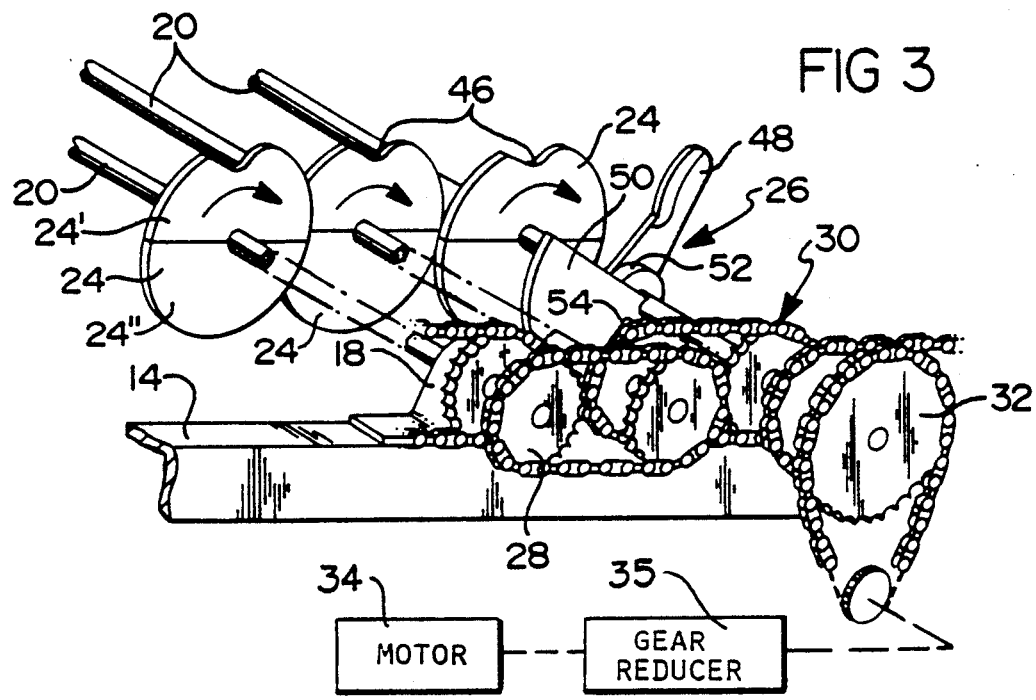
FIG. 3 is a partial isometric view of the conveyor of FIGS. 1 and 2, and FIGS. 4 and 5 are schematic views of conveyor rotors illustrating part transfer progression.

Referring to FIGS. 1, 2 and 3, a conveyor 10 has a frame 12 comprising side rails 14 mounted on a machine base 16. Pillow block bearings 18 on the side rails support opposite ends of a plurality of parallel shafts 20 which are spaced along the rails. Each shaft 20 is the basis of a rotor 22 which includes a pair of spaced discs 24 keyed to the shaft 20 for rotation therewith, a pair of spaced gates 26 which are journaled on the shaft 20 for free rotation thereon, and an end sprocket 28 fixed to the shaft for positive continuous shaft rotation by a chain drive 30. The chain drive 30 includes a drive sprocket 32 coupled to a motor 34 (FIG. 3) through a gear reducer 35.

Figure 4:
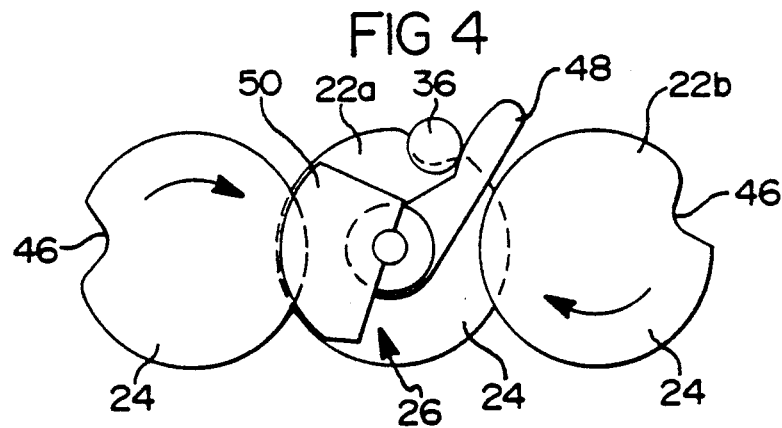
Figure 5:
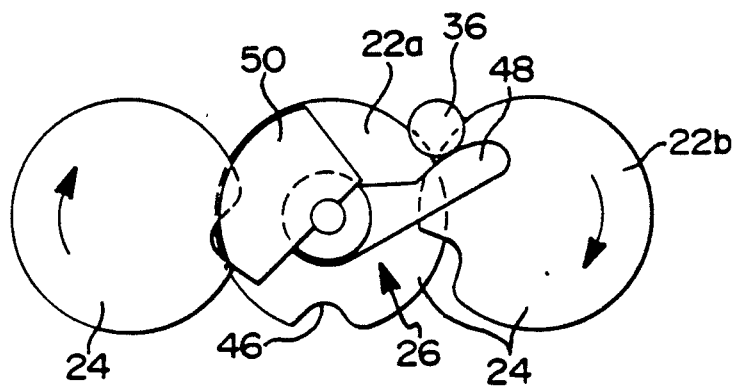

The spacing of the shafts 20 along the side rails 14 is less than the diameter of the discs 24 so that adjacent discs overlap. To accommodate the overlap, adjacent discs 24 are offset or axially spaced on their respective shafts, as best shown in FIG. 1. The precise location of each disc is determined by the geometry of the camshaft 36 being carried by the conveyor 10. The camshafts 36 have a few journals 38 and many lobes 40 spaced along its length. The journals and lobes are machined surfaces which must not be damaged and thus comprise zones restricted against contact by the conveyor. The barrel 42 or minimum diameter of the camshaft is exposed between the journals 38 and lobes 40 and provides permissible contact points for the discs 24. Thus discs 24 on one shaft are positioned to engage convenient barrel 42 locations and the discs on the adjacent shaft are positioned to engage neighboring barrel 42 locations. The discs are thus thin enough to fit into the barrel spaces. For convenience of assembly, each disc is divided along the disc diameter into two parts 24' and 24" secured together at a hub 44. The outer periphery of one of the parts 24' has a notch 46 or recess large enough to receive the camshaft barrel 42 for moving the camshaft 36 as the rotor 22a rotates into engagement with the adjacent downstream rotor 22b, as shown in FIGS. 4 and 5. The notch 46 is shaped to allow the camshaft or other part to slip out of the notch when it reaches the adjacent rotor 22b to enable the first rotor 22a to continue its rotation without interruption. The downstream rotor 22b will pick up the part for further incremental movement when its notch 46 reaches the part. In the meantime the part rotates in the nip of the rotors, i.e., in the region where the discs appear to meet as seen from the ends of the rotors, as the receiving notch approaches.

The gates 26 are shown to be outboard of the discs 24 but the disc and gate positions may be reversed, if so desired. The gate is best shown in FIGS. 3-5; although it is shown on only one rotor for clarity, in practice a pair of gates is used for each rotor except the first rotor on the upstream end of the conveyor. Each gate 26 comprises a lever 48 and a stop 50 which are interconnected by a hub 52 and move as a unit. The stop 50 is a fan-shaped blade which extends from each rotor toward the adjacent upstream rotor and projects radially outward substantially as far as the disc 24 and moves between open and closed positions to selectively clear and block entry of a part into the notch 46 of the rotor 22. The lever 48 controls the position of the stop 50 and extends generally upwardly beyond the edge of the disc 24 into the path of the part 36. As a part 36 is moved by one rotor toward another it moves the lever as well to swing the stop 50 up to the region where a subsequent part may be lodged to prevent the advancement of the subsequent part into the notch 46. As long as the first part is in the idle position, shown in FIG. 5, the lever maintains the stop in the blocking position. When the first part is advanced further downstream to release the lever, the gate rotates back to a stand-by position to move the stop 50 from the blocking position. The lower edge of the blade carries a counterweight 54 to bias the gate to the stand-by position.

Since the conveyor is open at its top, a part can be loaded onto the conveyor anywhere along its length. It is proposed that the conveyor extend alongside several machining stations so that as a part is finished at a station it can be hand loaded onto the conveyor 10 by the machine operator. To assist in loading a part, guides 56 supported on the side rails 14 and extending above the conveyor have tapered nylon surfaces 58 for longitudinally locating the part for proper registry of the discs 24 and camshaft barrels 42. The operator needs only to locate a rotor which is not already occupied and insert the part as shown by the arrow in FIG. 2. The part will move the lever 48 to block an additional part advancing from the upstream rotor and will be moved downstream as soon as a notch 46 arrives at the part.

At the discharge end of the conveyor the last rotor has special gates 26' to aid in unloading the parts as shown in FIG. 2. These gates 26' have a lever 48' which is longer than the other levers 48 and has an upturned hook 60 on its end forming a pocket 62 sufficient to cradle the part 36. When a part is carried by the last rotor to the point where it falls from the notch 46, it rolls down the lever 48' into the pocket 62 and remains there until it is removed by the loading device for the next operation. Then the lever will swing up to stand-by position. The counterweight 54' is heavy enough to offset the weight of the part on the lever 48'.

It will thus be seen that the conveyor 10 provides a transfer function which protects the machined surfaces of camshafts, permits convenient top loading anywhere along the conveyor, allows accumulation of parts and has continuously rotating rotors with no slip clutches.

The embodiments of the invention in which an exclusive property or privilege is claimed are defined as follows:

1. A transfer apparatus for moving shaft-like parts from one station to another comprising:
    a frame supporting a linear array of horizontal parallel rotors, each rotor mounted for rotation about its axis;
    drive means coupled to the rotors for continuously driving the rotors for uninterrupted rotation;
    each rotor including a pair of spaced discs mounted for rotation with the respective rotor, the discs of each rotor overlapping and axially spaced from the discs of adjacent rotors;
    each pair of discs having aligned notches for receiving a part and carrying the part in the direction of disc rotation; and
    gate means responsive to the presence of a first part engaged by a pair of discs for preventing the movement of a second part into the notches of a pair of discs already engaging the first part.

2. The invention as defined in claim 1 wherein the gate means includes a lever and a gate journaled on each of a plurality of rotors.

3. The invention as defined in claim 1 wherein the gate means comprises at least one gate journaled on a rotor for rotary movement independent of rotor rotation between open and closed positions for respectively clearing and blocking the path of the second part, the gate having a lever extending into the path of the said first part for rotation of the gate about the rotor to closed position by movement of the first part to thereby block the path of the second part when the lever is rotated to closed position.

4. The invention as defined in claim 3 including means for biasing the gate to open position when the lever is free of engagement by the first part.

5. The invention as defined in claim 3 including a counterbalance on the gate to move the gate to open position when the lever is free of engagement by the first part.

6. The invention as defined in claim 3 wherein the gate has a stop portion for blocking the path of the second part comprising a blade extending radially outwardly substantially as far as the discs.

7. The invention as defined in claim 1 wherein the part has a plurality of axially spaced restricted zones where engagement by the discs is prohibited and the discs are located to engage the part only at locations spaced from the restricted zones.

8. The invention as defined in claim 1 wherein for each disc upstream of another disc, the part is carried by the notch in the upstream disc to the periphery of the adjacent downstream disc, and wherein the notch is formed to disgorge the part upon contact with the downstream disc so that as the discs continue to rotate the part rides on both discs until it is engaged and carried forward by the notch in the downstream disc.

* * * * *